Aug. 2, 1938.    H. HERMANI    2,125,834
APPARATUS FOR INSERTING PINTLES IN BOX PARTS
Filed June 12, 1935    4 Sheets-Sheet 1

INVENTOR.
Henry Hermani
BY
ATTORNEY.

Aug. 2, 1938.   H. HERMANI   2,125,834
APPARATUS FOR INSERTING PINTLES IN BOX PARTS
Filed June 12, 1935   4 Sheets-Sheet 2
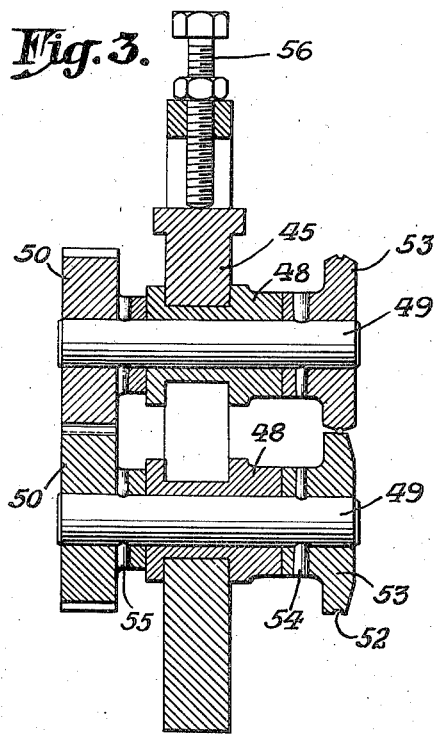
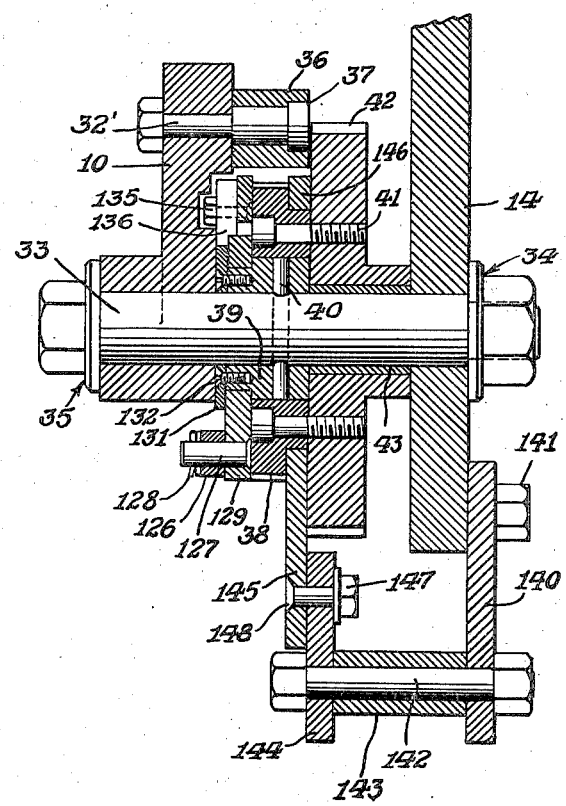
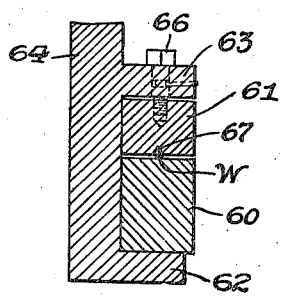
INVENTOR.
Henry Hermani
BY
ATTORNEY.

Aug. 2, 1938.  H. HERMANI  2,125,834
APPARATUS FOR INSERTING PINTLES IN BOX PARTS
Filed June 12, 1935  4 Sheets-Sheet 3

INVENTOR.
Henry Hermani
BY
ATTORNEY.

Aug. 2, 1938.  H. HERMANI  2,125,834
APPARATUS FOR INSERTING PINTLES IN BOX PARTS
Filed June 12, 1935  4 Sheets-Sheet 4
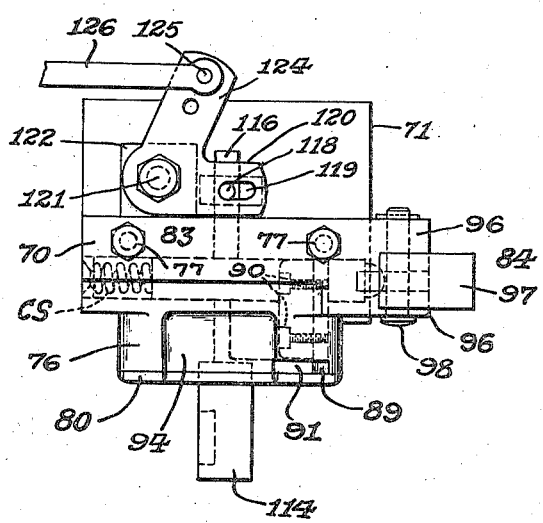
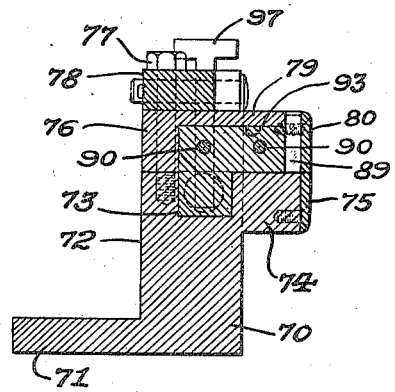
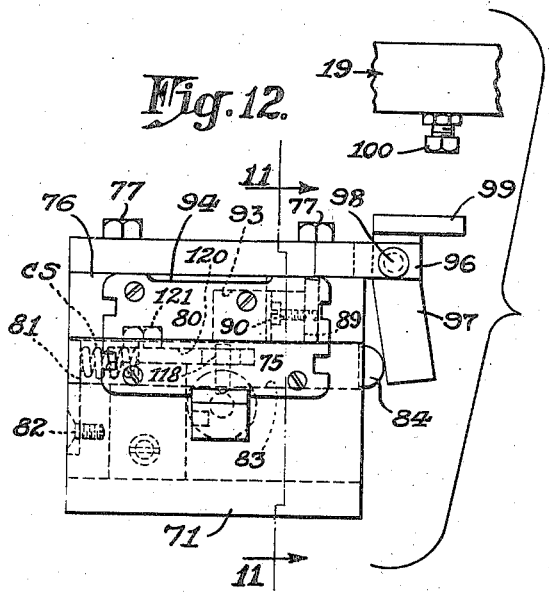
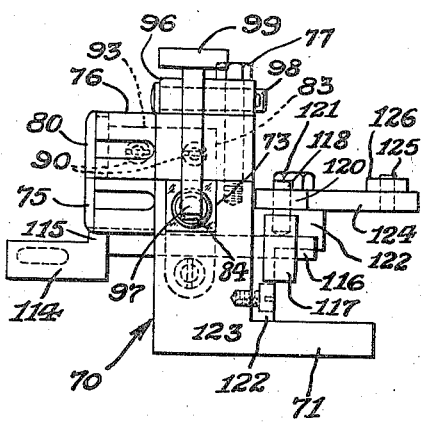
INVENTOR.
Henry Hermani
BY
ATTORNEY.

Patented Aug. 2, 1938

2,125,834

UNITED STATES PATENT OFFICE 2,125,834

APPARATUS FOR INSERTING PINTLES IN BOX PARTS

Henry Hermani, Baltimore, Md., assignor, by mesne assignments, to Owens-Illinois Can Company, Wilmington, Del., a corporation of Delaware Application June 12, 1935, Serial No. 26,261

6 Claims. (Cl. 29—11)

My present invention relates to apparatus for applying hinge pintles to box part blanks, and particularly to improvements in the structure disclosed in my prior Patent No. 1,267,409.

In my said prior patent I have disclosed an apparatus to form the blanks to receive the pintles, and means to form the pintles and insert them in the blanks. In said patent the blanks are introduced into the general feeding mechanism by a traveling conveyor on which the blanks are placed with their open sides disposed in the same direction, the conveyor moving the blanks successively into contact with means acting somewhat on the order of an escapement to permit the blanks to move forward individually at proper timed intervals. Each escaping blank is introduced into a carrier channel within which it is advanced to position the blank at predetermined points in the channel. At predetermined intervals the channel also shifts laterally to position the blanks successively in operative relation to the several forming stations or mechanisms, indicated generally in the said patents as A, B, C and D, (see Figs. 4-7). In the said patent station A is the entrance to the said channel, station C is the station at which the blank is prepared for pintle application, and station D is the pintle applying station; no work being performed at station B, which is designed to provide the supply for station C without complicating the general operation by attempting to introduce a blank and properly located on the die at station C.

The present invention relates particularly to pintle forming and applying mechanisms to be located at station D, and the operations leading up thereto may be carried out by the same mechanism as shown and described in the said patent in connection with stations A, B and C.

Generally stated the present invention resides in the provision of means for feeding a wire strand step by step to improved means for cutting and applying the pintles to the box parts, and characterized by relatively simple construction and arrangement of parts, positive operation, and of such nature as not to become easily damaged or placed out of commission during operation of the apparatus, thus affording a greater output and requiring less repairs and attention.

As in my said patent, the present invention utilizes a ram or reciprocating punch plate operating transversely to the carrier channel for the box parts, and effecting through its reciprocating movements the operation of the wire feeding means, as well as the means for forming and inserting the pintles.

The present invention also includes the provision of relatively simple means, operable by the movements of the successive can parts onto the die which receives the same for application of the pintles, to effect control of the wire feeding means so that wire is fed to the cutting and applying mechanism each time a can part is placed on said die, but in the event a can part is not fed to the die, to make the wire feeding mechanism inoperative.

The foregoing and other objects and advantages of the invention and the improvements provided thereby will become more apparent and will be pointed out during the course of the following detailed description of the accompanying drawings, in which Fig. 1 is a front elevation of the end of the apparatus or machine carrying the wire feeding mechanism and the operating means therefor;

Fig. 3 is an enlarged sectional view taken on the line 3—3 of Fig. 1;

Fig. 4 is an enlarged sectional view taken on the line 4—4 of Fig. 6;

Fig. 5 is an enlarged sectional view taken on the line 5—5 of Fig. 2;

Fig. 10 is a top plan view of the die which receives the can or box part for application of the pintle thereto, together with the pintle inserting means, and the means controlling preventing feeding of the wire if no blank is supplied to the die;

Fig. 11 is a sectional view taken on the line 11—11 of Fig. 12;

Fig. 12 is a front elevation of the die and mechanism for inserting the pintles;

Fig. 13 is an end elevation of the mechanism shown in Fig. 12; and

Fig. 14 is a perspective view of the part or plunger which engages and moves the pintles into final inserted position on the blanks.

Figure 1:
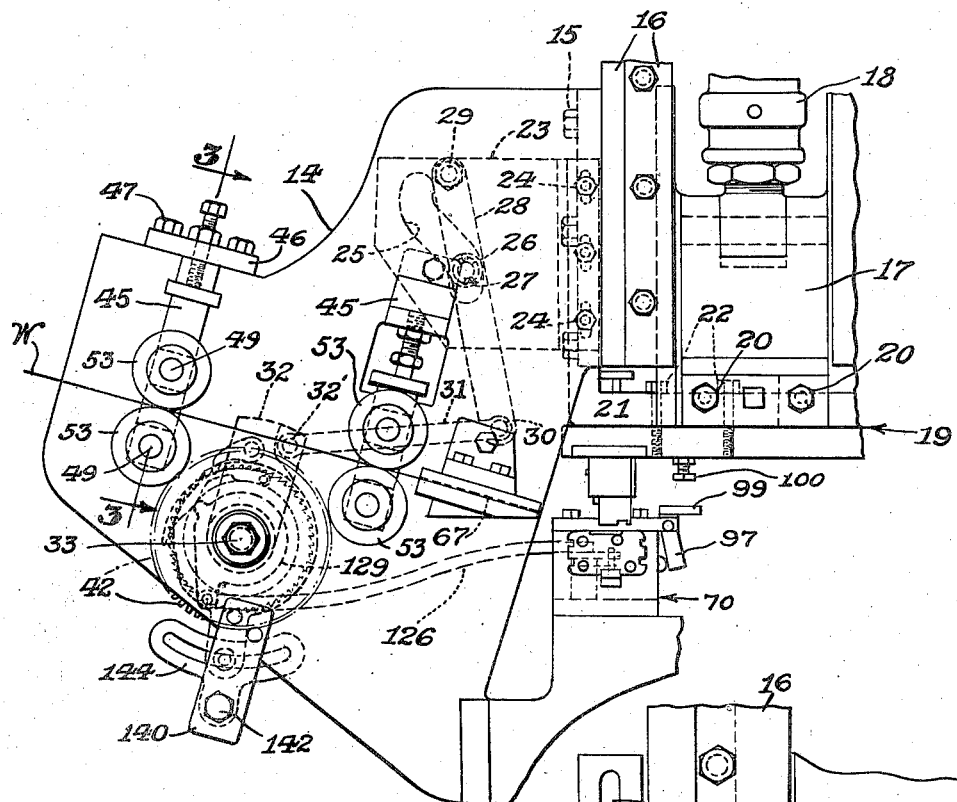

In Fig. 1 of the drawings the numeral 14 designates the plate or bracket at one end of the machine (which corresponds to the plate or bracket 30b of Patent 1,267,409) and which may be secured in place or on the frame of the machine by any suitable means such as explained in the said patent. The numeral 15 designates bolts which secure one of a pair of guides 16 to bracket 14, said guides being the same in construction and purpose as the guides of the said patent, and between which operate the head 17 (corresponding to the part 65 of the said patent) and connected by the coupling 18 to a crank mechanism such as that shown in Fig. 1 of the said patent and operated by shaft 31 in said patent, but not shown in this application. The punch plate 19 is secured to head 17 by bolts 20 for reciprocating movement therewith.

Up to the present point the construction disclosed is substantially the same as that of the corresponding parts of the said patent. However, whereas in the patent the wire feeding mechanism is operated by crank and levers driven from the shaft 31 of the patent, under the present invention I provide for the elimination of a great many of these parts by the provision of a simply and strongly constructed cam and lever mechanism operated directly by the reciprocating movement of the head 17. To this end I provide part 21, secured to the plate 19 by bolts 22 and having a portion extending up along and adjacent said one of the brackets 16. Cam plate 23 is adjustably connected to the upward extension of part 21 by bolt and slot arrangements 24 to provide for adjustability of the cam plate which, of course, reciprocates with the head 17 and plate 19 due to the connections mentioned.

The outer end of the plate 23 is provided with a cam slot 25 in which is disposed a roller 26 mounted on a lug 27 on a lever 28 pivoted at its upper end on a stud 29 supported by the bracket 14. The lower end of the lever 28 is pivotally connected at 30 to one end of a link 31, the other end of which is connected to a plate 32 (see also Figs. 4 and 6). The plate 32 is journaled on a shaft 33, one end of which is secured to bracket 14 by washer and nut 34. The plate 32 is held on the other end of shaft 33 by a similar washer and bolt 35, and has free oscillating movement on the shaft. A pawl 36 is pivotally connected to the plate 32 at 37 for engagement with the teeth of a ratchet 38 journaled on a sleeve 39 pinned to the shaft 33 as indicated at 40.

The ratchet 38 is connected by screws 41 to a relatively large gear 42 journaled on a sleeve 43 on shaft 33.

Considering the structure thus for defined it should be obvious that reciprocation of the plate 23 with the parts 17, 19 and 21 will move the roller 26 in the cam slot 25 oscillating lever 28 on pivot 29, which, through the link 31 connected to the lower end of the lever 28 and to part 32, moves the pawl to engage the ratchet 38 and partially rotate the ratchet subject to the conditions hereinafter given in connection with the rendering of the wire feeding mechanism inoperative.

Figure 2:
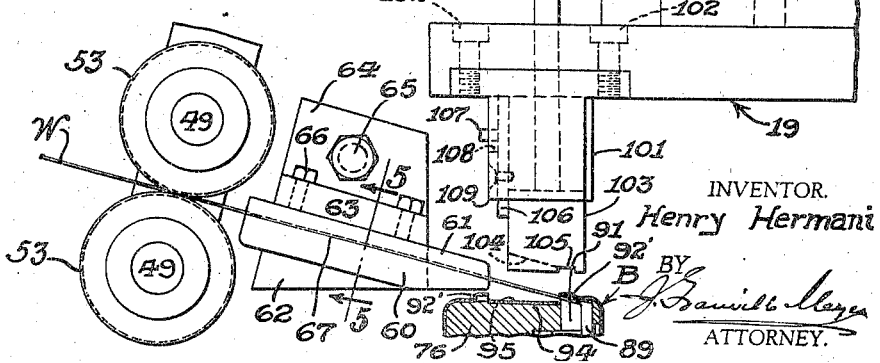
Fig. 2 is a front elevation of a portion of the machine showing guiding means for the wire, and the cutting means co-operating therewith to form the pintles, and fragments of the blank and die holding the blank, in section.

In Figs. 1, 2 and 3 I have shown the means for feeding a wire W predetermined distances so that predetermined lengths of the wire may be cut to form the pintles. Brackets 45 have upper flanges 46 secured to the plate 14 as by means of bolts 47, and support bearings 48 through which are journaled shafts 49. At one side of each of the brackets 45, and at corresponding ends of the shafts 49, are pairs of gears 50 the lower of which mesh with the gear 42 to be driven thereby. The upper of the gears 50 mesh with the lower ones and are driven thereby. The rotation of said gears is obviously such as to cause similar movement of the gears on the respective brackets 45 to cause advancing movement of the wire W which is frictionally gripped between grooves 52 in driven rollers 53 keyed to shafts 49 as indicated at 54. Of course the gears 50 are also keyed to the shafts 49 as indicated at 55, so that when gear 42 is rotated as hereinafter pointed out all of the gears 50 and the wire feed or driven rollers 53 will rotate to advance the wire step by step. Adjusting screws 56 may be provided to regulate pressure between the rollers 53 in known manner, such means being also shown in my said prior patent.

The parts of the wire feeding mechanism, that is, the arrangement of gears and feeding rollers above described is substantially the same as in the said prior patent, but the means for guiding the wire from the feed or driven rollers 53 is different in the present case, and is shown best in Figs. 2 and 5. The present guide means is arranged to guide the wire to the pintle forming mechanism and into the box parts at one end thereof at an exact angle and under exact tension. In Figs. 2–5 the numerals 60 and 61 designate respectively the lower and upper plates of the wire guiding mechanism each having V-shaped channels cut in their confronting faces and alined with each other, as well as with the grooves 52, to form a channel 67 between plates 60 and 61. The plates 60 and 61 are arranged between flanges 62 and 63 of a bracket or support 64 secured to the bracket 14 as by means of a bolt 65. Screws 66 are mounted through the flange 63 to engage the upper surface of the plate 61, and are adjustable to regulate the desired tension on the wire being fed between the plates 60 and 61 through the channel 67 formed by the confronting V-shaped grooves in the respective plates. One end of the channel 67 is disposed adjacent the wire feeding rollers as shown in Fig. 2 while the other end of the channel or outlet end is disposed adjacent the forming die and pintle forming and inserting mechanism about to be described.

Before proceeding with a detailed description of the construction and operation of my new pintle forming and inserting mechanism, I would make reference to Figs. 4–7 of Patent 1,267,409 wherein the different stations at which the forming operations are performed on the blanks or containers passing through the machine are designated by the letters A, B, C and D. It will be understood that the blanks or box parts may be fed to my present pintle forming and inserting or applying mechanism by the same feeding means described in said patent, and that the features or construction and operation of parts about to be given would be located at the point of station D in the said patent.

Referring now to Figs. 10–13 inclusive the numeral 70 designates generally the base or support for the die which receives the formed up box part, as well as for parts of the mechanism for controlling the operation of the wire feeding mechanism subject to delivery of box parts to the die, and also mechanism for moving the formed pintle to engage it under both ears of the formed up blank or box part.

Base 70 includes a flange 71 for attachment to the frame of the machine, and upstanding portion 72 having a channel 73 across its top, and a forwardly projecting portion 74 to receive a face plate 75. On top of the part 72 is a cover plate 76 secured to the base by screws 77 which extend also through a narrow plate 78 on top of the part 76 at the rear thereof. The part or cover 76 has a forwardly projecting end 79 above the projection 74 of the base, and to the forward end of which are secured another face plate 80 corresponding to the plate 75. The exterior shape of the parts 74, 79, 75 and 80 and the dimensions thereof as a unit is such as to snugly but removably receive the blanks which are moved thereon by the advancing mechanism described in the said patent, and constitute the die which receives and holds the containers during the pintle applying operation. The channel 73 in the part 72 extends substantially all the way thereacross and is closed at one end by a plate 81 held in place by screws 82 which extend through openings in the plate 81 and into the end of the part 72 below the channel 73.

The pintle inserter is shown in perspective in Fig. 14 and comprises an elongated block of substantially the same cross-sectional area as the channel 73 to slidably fit therein, the block being designated by the numeral 83 and having inserted in one of its ends a round headed abutment or adjustable screw 84 and being provided in its other end with an axially arranged opening or pocket 85 within which a coil spring CS is seated at one end, the spring abutting the plate 81 at its other end so as to normally urge the abutment 84 toward an actuating lever presently described.

On its top the block 83 has a preferably integrally formed lateral extension 86 which is flush with one side or rear of the block 83 and which extends beyond the opposite side or front of the block. A plate 87 is secured to the face of the extension 86 toward the abutment 84 and is of substantially the same configuration as the extension 86 on three sides thereof, but extends beyond the forward end 88 of the extension 86 and is provided with an upwardly projecting finger 89. When the block 83 is seated in the channel 73 in the manner described and as shown in Figs. 10–12, the finger 89 of the plate 87, which latter is rigidly secured to the extension 86 by screws 90, is disposed within an opening 91 in the part 79 at the end of the die which the box parts approach during feeding movement thereof toward the die. The opening 91, as shown in Fig. 2, and the tongue 89 are also in alinement with the portion of the wire which is fed through the channel 67 of the wire guides 60–61. It will also be noted in Fig. 2 that the said channel 67 through which the wire is guided is inclined relative to the opening provided by the ear 92 on the box part B as well as opening 91 in the die. This, as later pointed out is to facilitate accurate insertion of the wire into the opening provided by the ear 92 in the box part and into the opening 91 in the die into engagement with the tongue 89. During feeding movement of the wire into said openings the tongue 89 is retracted due to the action of the spring CS which urges the block 83 away from the plate 81 to normally hold the abutment 84 in position for engagement by the actuating lever presently described.

The interior of the cover 76 beneath the top 79 is provided with a recess 93 receiving the lateral extension of the block 83 and the end of the plate 87 which carries the finger 89, said recess being of sufficient length to permit reciprocating movement of the block 83 and the parts carried thereby, including the said finger 89 which of course moves in the opening 91.

At this time I wish to call attention to the fact that the part 79 or top cover for the die has a depression 94 in its upper surface, as does also the top edge of the plate 80, to receive the depressed portion 95 of the box part B as shown in Fig. 2. The depression is shown in plan in Fig. 10.

In order to reciprocate the block 83 and the parts carried thereby, I preferably provide on the plate 78 extensions 96 between which is pivotally mounted the arm 97 of the actuating lever for the block 83 and parts carried thereby, the lower end of the arm 97 being in alinement with the abutment 84 and normally maintained in contact therewith by the pressure of the spring which urges the block 83 outwardly against said arm of the lever. Both the lever 97, which is disposed in the path of movement of the abutment 84, and the end of the chamber 93 contacted by the plate 87 prevent the block from sliding out of its channel. The numeral 98 designates the pivot thru the arms 96 of the plate 78 and arm 97 connecting the lever to said arms. The other end of the lever has a horizontally disposed arm 99 formed on top of the arm 97 or rigidly connected thereto, and the press plate 19 carries an adjustable abutment or set screw 100 above the outer end of the arm 99, that is, beyond the pivot 98, so that each time the press plate descends the abutment 100 will engage arm 99 rocking arm 97 on pivot 98 and pushing against abutment 84 to move block 83 inwardly against the action of the spring CS to move the finger 89 across the opening 91, that is, from the position of Figs. 7 and 8 to the position of Fig. 9 to insert the pintle beneath the ear 92' which is alined with an opposite ear 92 on the blank or box part. Of course these movements take place at a predetermined interval relative to the feeding of the wire and the cutting thereof to form the pintles and position them for the said insertion.

Figure 7:
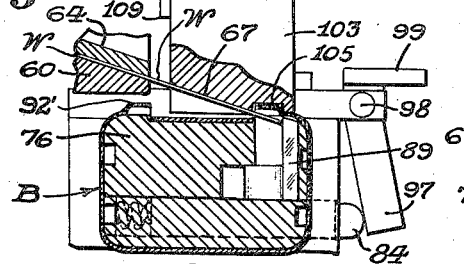
Figs. 7, 8 and 9 are detail views partly in elevation and partly in section illustrating the means for inserting and cutting the pintles and the position of the parts during the several steps leading up to the time when the pintle is finally inserted.
Figure 8:
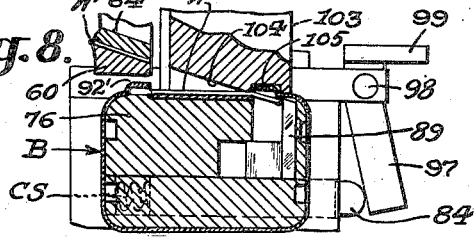
Figure 9:
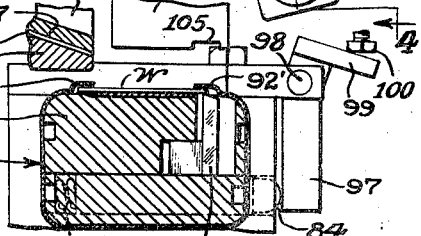

The mechanism for cutting the lengths of wire to form the pintles is shown in Fig. 2 comprising a holder 101 secured to the part 19 by screws 102. The holder 101 receives a guide 103 provided with an angular milled recess 104 which assists in guiding the wire from the outlet end of the channel 67 to the opening 91 in the die and beneath the ear 92 of the box part, the part 103 being provided with a notch 105 which engages over the ear 92 so as not to deform the ear. At the time that the wire is inserted in the opening 91 and under ear 92 the lower end of part 103 rests on the confronting surface of the box part and the wire is engaged not only in the milled recess 104, but is also engaged by a pin 106 which carries a projection 107 extending through a slot or elongated opening 108 in the guide 101. The end of the elongated slot through which the pin 107 extends stops movement of the pin when it engages the wire in the position in which the wire is shown in Figs. 2 and 7 and then as the frame 19 descends further the cutting edge 109 severs the wire against the edge of the plate 60. During this descending movement the pin 106 presses the wire down flat against the top of the box part as shown in Fig. 8 so that when the finger 89 is moved in pintle inserting direction as previously described the pintle is also inserted under the ear 92' and thus applied to the box part. Part 103 works free in holder 101 and is held up by a flange on the inside of the holder. Should the part 103 become stuck in operation it will be pressed down in place for proper engagement of the wire on the next down stroke by engagement of stem 110 with plate 111 adjustably secured to the frame of the machine by a bolt 112 engaging to a slot 113 of the plate and into the frame of the machine.

As previously mentioned, my present invention also provides means operable by the feeding of the box parts or blanks onto the die, that is, by the placement of the box parts on the die, to control the operation of the wire feeding mechanism so that in the event no box part is positioned on the die the wire feeding mechanism will not operate thus preventing the feeding of the lengths of wire from which the pintles are made over the die itself.

This means is shown best in Figs. 10, 13, 1, 4 and 6. Referring to Figs. 10 and 13, it will be noted that projecting beyond the forward face of the die, that is, beyond plates 75 and 80, is the forward end of a plunger designated by the numeral 114 and having an upstanding short shoulder or latch member 115 confronting or disposed in the path of movement of the lower edges of the open ends of the box parts which are inserted on the die. The plunger also includes a stem 116 slidably mounted through the part 72 and having keyed to its rear end a collar 117 provided with a stud 118 engaging in a slot 119 in the arm 120 of a bell crank lever pivotally mounted at 121 on a suitable support 122 attached to the part 72 by screw 123. The other arm 124 of the bell crank is provided with openings 125 to either of which may be pivotally connected an elongated link 126 which leads back to the ratchet and gear mechanism of Figs. 1 and 6.

Figure 6:
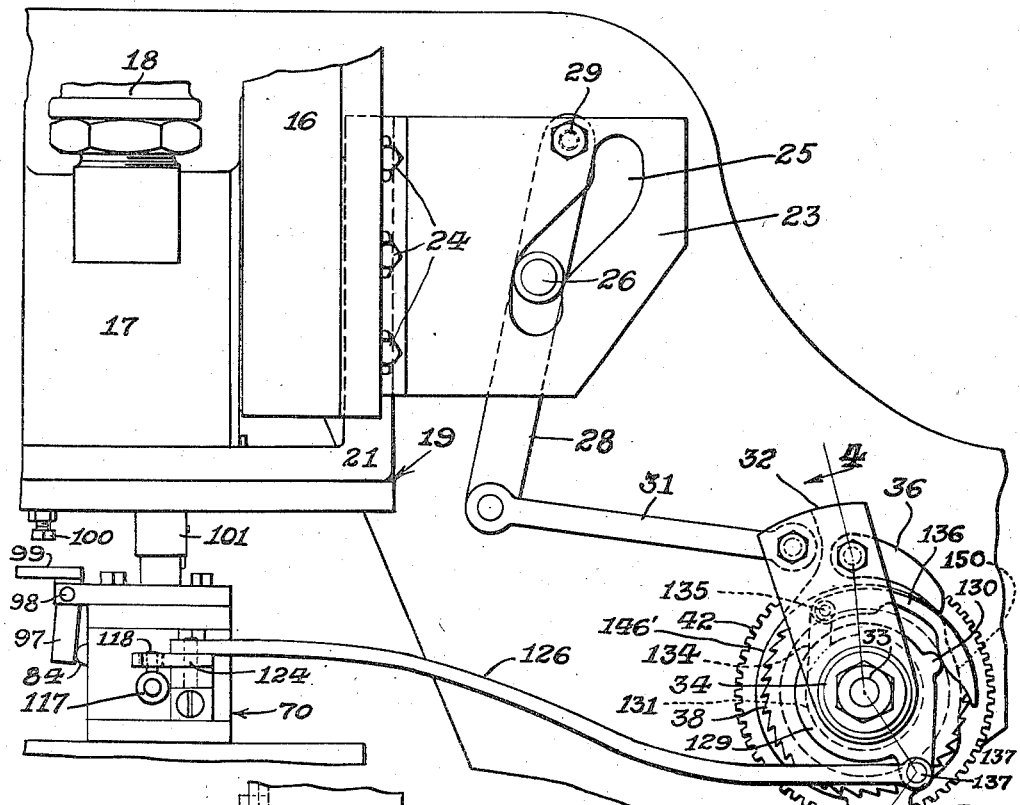
Fig. 6 is an enlarged rear elevation of the end of the machine shown in Fig. 1 showing the operating means for the wire feeding mechanism, and controlling mechanism therefor.

Before proceeding with a description of the mechanism of Figs. 1 and 6 to which the link 126 is connected, I would refer again to Figs. 10 and 13 and point out that each time a box part is fed onto the die, the lower edge will engage shoulder or latch member 115 of the plunger which is connected to the bell crank arm 120, and the movement of the box part onto the die will move the plunger rearwardly to oscillate the bell crank through the medium of the lug 118 engaging in slot 119. This movement reciprocates link 126 for the purpose of controlling the ratchet and gear feed mechanism of Figs. 1, 4 and 6 to which reference will now be made.

The other end of the link 126 as shown best in Fig. 4 receives a stud 127 and may be held thereon by a cotter pin 128. The stud 127 is carried by an arm or extension on ring 129 journaled on the reduced end of the sleeve 39 on which the ratchet wheel 38 is journaled, and as shown in Figs. 1 and 6 the ring is provided with a lobe 130. The numeral 131 designates a ring connected by screws 132 to the sleeve 39, which is pinned to a shaft 33, said ring having rigidly connected thereto an upstanding arm 134 having pivotally connected thereto at 135 an arcuate member 136 disposed beneath a side of the pawl 36 and also having a convex surface 137 adjacent its free end adapted at certain times to be brought into and out of contact with the lobe 130.

With the foregoing in mind the operation of the mechanism for controlling the feed of the wire under my present invention is as follows: each time a blank is fed onto the die it oscillates the bell crank which operates link 126 in the manner previously given, and the part 129 is oscillated by the stud connection 127 to link 126 (Fig. 4) to move the lobe 130 upward from contact with the convex surface 137 allowing the part 136 to fall below the ratchet teeth so that the pawl 36 will engage with the ratchet teeth to cause rotation thereof, turning the gear 42 and hence the gears 50 which turn the feed rollers 53 effecting the feeding of the wire. However, if no box part is fed onto the die the lobe 130 remains in contact with the convex surface 137 of part 136 maintaining the pawl 36 out of contact with the ratchet teeth or in the position of Fig. 6 so that when the cam mechanism of Fig. 1 operates the pawl the ratchet will not be rotated and the pawl will ride free above the ratchet wheel on the upper or outer surface of part 136.

In order to provide for adjustment of the length of wires fed to the pintle forming mechanism and to regulate the lengths of the pintle, I provide (Figs. 4 and 6) plate 140, connected to the bracket 14 as at 141, and connected to the lower end of the plate 140 as by means of a bolt 142 extending through a sleeve 143, a plate 144 having a slot 145 in the upper extension thereon. It will be noted that the bolt 142 and sleeve 143 space the plates 140 and 144 in Fig. 4. An extension for arm 145 on ratchet shield 146 may be adjustably positioned by loosening nut 147 on screw 148 which extends through arm 145 and slot 144. The ratchet shield is provided with an opening or slot 150 adjacent the pawl which may be adjusted relative to the pawl by turning the shield 146 in the manner specified to regulate the amount of movement of the ratchet wheel by the pawl by controlling the number of teeth exposed through the opening for contact by the pawl.

What I claim is:

1. In an apparatus for forming box parts having ears and for forming and applying hinge pintles to said ears, a vertically reciprocable die-carrying forming head, a support to receive the box parts with the ears thereof in pintle receiving position, a wire feeding device designed to feed predetermined lengths of wire across said box parts with one end thereof inserted underneath an ear, said device including a pair of pinch rolls and a guide for the wire, a drive shaft for periodically actuating said pinch rolls, means for periodically indexing said drive shaft comprising a ratchet wheel mounted on said shaft, an oscillatable pawl cooperating with said ratchet wheel, a lever capable of swinging movement about a horizontal axis and having its free end connected to said pawl, a plate mounted for vertical reciprocation with said forming head, there being a pin and cam slot connection between said lever and plate whereby vertical reciprocation of said head will cause swinging movement of said lever, means for rendering said indexing means inoperative in the absence of a box part upon said support comprising a pawl engaging member having a smooth surface upon which said pawl is adapted to slide when in engagement therewith, said pawl engaging member being movable into and out of engagement with said pawl and being normally in engagement therewith, a latch member projecting into the path of movement of said box parts on said support, and means connecting said latch member and pawl engaging member and adapted upon engagement of said latch member with a box part on said support to withdraw said pawl engaging member from engagement with said pawl.

2. In an apparatus for forming box parts having ears and for forming and applying hinge pintles to said ears, a vertically reciprocable die-carrying forming head, a support to receive the box parts with the ears thereof in pintle receiving position, a wire feeding device designed to feed predetermined lengths of wire across said box parts with one end thereof inserted underneath an ear, said device including a pair of pinch rolls and a guide for the wire, a drive shaft for periodically actuating said pinch rolls, means for periodically indexing said drive shaft comprising a ratchet wheel mounted on said shaft, an oscillatable pawl cooperating with said ratchet wheel, a lever capable of swinging movement about a horizontal axis and having its free end connected to said pawl, a plate mounted for vertical reciprocation with said forming head, there being a pin and cam slot connection between said lever and plate whereby vertical reciprocation of said head will cause swinging movement of said lever, means for rendering said indexing means inoperative in the absence of a box part upon said support comprising a pawl engaging member having a smooth surface upon which said pawl is adapted to slide when in engagement therewith, said pawl engaging member being movable into and out of engagement with said pawl, and being normally in engagement therewith, a latch member projecting into the path of movement of said box parts upon said support, means connecting said latch member and pawl engaging member and adapted upon engagement of said latch member with a box part on said support to withdraw said pawl engaging member from engagement with said pawl, a ratchet shield having an opening therein through which said pawl engages said ratchet wheel, and means permitting relative angular adjustment of said shield about the axis of said shaft with respect to said pawl.

3. In an apparatus for forming box parts having ears and for forming and applying hinge pintles to said ears, a vertically reciprocable die-carrying forming head, a support for successively receiving the box parts with the ears thereof in pintle receiving position, a wire feeding mechanism designed to feed predetermined lengths of wire across said box parts with one end thereof inserted underneath an ear, said device including a pair of pinch rolls and a guide for the wire, a drive shaft for periodically actuating said pinch rolls, means for periodically indexing said drive shaft comprising a ratchet wheel mounted on said shaft, an oscillatable pawl cooperating with said ratchet wheel, a lever capable of swinging movement about a horizontal axis and having its free end connected to said pawl, a plate mounted for vertical reciprocation with said forming head, there being a pin and cam slot connection between said lever and plate whereby vertical reciprocation of said head will cause swinging movement of said lever, means for rendering said indexing means inoperative in the absence of a box part upon said support, a ratchet shield having an opening therein through which said pawl engages said ratchet wheel, and means permitting relative angular adjustment of said shield about the axis of said shaft with respect to said pawl.

4. In an apparatus for forming box parts having ears and for forming and applying hinge pintles to said ears, a vertically reciprocable die-carrying forming head, a support to receive the box parts with the ears thereof in pintle receiving position, a wire feeding device designed to feed predetermined lengths of wire across said box parts with one end thereof inserted underneath an ear, a cutoff knife carried by said head for severing said predetermined lengths of wire to form the pintles, a block slidable in said support and having a pintle-engaging finger formed thereon designed to engage the inserted ends of the severed pintles to shift the pintles bodily to their final inserted position upon movement of said block in one direction, spring means normally urging said block in the other direction to an inoperative position, a portion of said block projecting beyond the confines of said support, and a bell crank lever having one end thereof bearing against said projecting portion of said block, the other end of said lever being positioned in the path of movement of the descending head whereby the severed pintles are moved to their final position upon descent of said head.

5. In an apparatus for forming box parts having ears and for forming and applying hinge pintles to said ears, a vertically reciprocable die-carrying forming head, a support to receive the box parts with the ears thereof in pintle receiving position, a wire feeding device designed to feed predetermined lengths of wire across said box parts with one end thereof inserted underneath an ear, said device including a pair of pinch rolls and a guide for the wire, a drive shaft for periodically actuating said pinch rolls, a ratchet wheel on said shaft, a pawl cooperating with said ratchet wheel for periodically indexing said ratchet wheel and shaft, means operable upon reciprocation of said die-carrying head for periodically actuating said pawl, a cutoff knife carried by said head for severing said predetermined lengths of wire to form the pintles, a block slidable in said support and having a pintle-engaging finger formed thereon designed to engage the inserted ends of the severed pintles to shift the pintles bodily to their final inserted position upon movement of said block in one direction, means normally urging said block in the other direction to an inoperative position, a portion of said block projecting beyond the confines of said support, and a bell crank lever having one end thereof bearing against said projecting end of said block, the other end of said lever being positioned in the path of movement of the descending head whereby the severed pintles are moved to their final position upon descent of said head.

6. In an apparatus for forming box parts having ears and for forming and applying hinge pintles to said ears, a vertically reciprocable die-carrying forming head, a support to receive the box parts with the ears thereof in pintle receiving position, a wire feeding device designed to feed predetermined lengths of wire across said box parts with one end thereof inserted underneath an ear, a cutoff knife carried by said head for severing said predetermined lengths of wire to form the pintles, a block slidable in said support and having a pintle-engaging finger formed thereon designed to engage the inserted ends of the severed pintles to shift the pintles bodily to their final inserted position upon movement of said block in one direction, means normally urging said block in the other direction to an inoperative position, a bell crank lever, said block projecting into the path of movement of one end of said lever, the other end of said lever projecting into the path of movement of the descending head, and means for varying the moment of contact between said lever and head to vary the time of the pintle shifting operation.

HENRY HERMANI.